United States Patent [19]

Phipps, Jr. et al.

[11] 4,140,669

[45] Feb. 20, 1979

[54] WARP-RESISTANT REINFORCED THERMOPLASTIC COMPOSITIONS COMPRISING POLYESTER RESINS, TALC AND SILICA

[75] Inventors: Donald L. Phipps, Jr., Mount Vernon; Allen D. Wambach, Evansville, both of Ind.

[73] Assignee: General Electric Company, Pittsfield, Mass.

[21] Appl. No.: 866,061

[22] Filed: Dec. 30, 1977

[51] Int. Cl.$^2$ ................................................ C08K 3/36
[52] U.S. Cl. .................................... 260/40 R; 260/860
[58] Field of Search ............................ 260/40 R, 860

[56] References Cited

U.S. PATENT DOCUMENTS

| | | | |
|---|---|---|---|
| 3,742,087 | 6/1973 | Nield | 260/860 |
| 3,824,209 | 7/1974 | Anderson | 260/45.9 R |
| 3,953,394 | 4/1976 | Fox et al. | 260/40 R |

*Primary Examiner*—Sandra M. Person
*Attorney, Agent, or Firm*—Morgan, Finnegan, Pine, Foley & Lee

[57] ABSTRACT

Reinforced thermoplastic compositions are provided comprising a poly(1,4-butylene terephthalate) resin, a poly(ethylene terephthalate) resin, and a reinforcing, warp resisting combination of talc and silica. The compositions optionally include a segmented copolyester resin, a silicon polymer and/or a fibrous glass reinforcement. The compositions are moldable to articles having improved resistance to warpage during heat treatment in comparison with molding compositions of talc, (poly(1,4-butylene terephthalate) and poly(ethylene terephthalate).

10 Claims, No Drawings

WARP-RESISTANT REINFORCED THERMOPLASTIC COMPOSITIONS COMPRISING POLYESTER RESINS, TALC AND SILICA

This invention relates to reinforced molding compositions which have improved deflection temperature under load (DTUL) in the molded article. More particularly, it pertains to compositions comprising a poly(1,4-butylene terephthalate) resin, a poly(ethylene terephthalate) resin, and a reinforcing, warp resisting additive therefor comprising talc and silica, in admixture.

BACKGROUND OF THE INVENTION

High molecular weight linear polyesters and copolyesters of glycols and terephthalic or isophthalic acid have been available for a number of years. These are described inter alia in Whinfield et al., U.S. Pat. No. 2,465,319 and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly(ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

It has been previously disclosed in co-pending application Ser. No. 662,910 filed Mar. 1, 1976, assigned to the same assignee as herein, that glass reinforced thermoplastic compositions of a polycarbonate resin and poly(1,4-butylene terephthalate) can be molded to articles having greater resistance to warpage or improved DTUL, in comparison with glass fiber reinforced poly(1,4-butylene terephthalate) resins. It is further disclosed in co-pending application Ser. No. 753,861 filed Dec. 23, 1976, assigned to the same assignee as herein, that zinc stearate when added to polyester polyblends elevates notched Izod impact strength, while maintaining unnotched impact strength, flexural strength and tensile strength and dramatically reduces sample-to-sample variability in elongation. Also it is disclosed in co-pending application Ser. No. 753,863, filed Dec. 23, 1976, and assigned to the same assignee as herein, that glass fibers in combination with a mineral filler provide molded articles with improved DTUL or reduced warpage. In addition, it is disclosed in co-pending application Ser. No. 747,635, filed Dec. 6, 1976, assigned to the same assignee as herein, that compositions comprising poly(butylene terephthalate), poly(ethylene terephthalate), a polycarbonate and glass fiber have increased DTUL and/or reduced warpage. It is disclosed in co-pending application Ser. No. 778,945, filed Mar. 18, 1977, that blends of a poly(1,4-butylene terephthalate) resin and a polycarbonate resin reinforced with fibrous glass, when admixed with a small amount of zinc stearate possess even less inherent warpage in the molded article and good moldability when compared with compositions of glass fiber reinforced poly(1,4-butylene terephthalate). It has now been discovered that blends of poly(1,4-butylene terrephthalate), poly(ethylene terephthalate), talc and silica possess very little inherent warpage in the molded article. Moreover, the poly(ethylene terephthalate) resin can be replaced in part with a segmented copolyester resin and part of the reinforcement can be replaced with a glass fiber. The improved DTUL is achieved without any appreciable decrease in other mechanical properties, such as, notched Izod impact strength, tensile strength, modulus and flexural strength.

DESCRIPTION OF THE INVENTION

According to this invention, there are provided reinforced thermoplastic compositions having increased resistance to warpage in comparison with glass reinforced poly(1,4-butylene terephthalate), useful for molding, e.g., injection molding, compression molding, transfer molding, and the like, the compositions comprising:

(a) a poly(1,4-butylene terephthalate) resin;
(b) a poly(ethylene terephthalate); and
(c) a reinforcing agent and warp resistance improving amount of a combination of (i) talc and (ii) silica.

The polyester resins of the compositions of this invention are available commercially or can be prepared by known techniques such as by the alcoholysis of esters of terephthalic acid with ethylene glycol or butanediol and subsequent polymerization, by heating the glycols with the free acids or with halide derivatives thereof, and similar processes. These are described in U.S. Pat. Nos. 2,465,319 and 3,047,539, and elsewhere.

Illustratively, these high molecular weight polyesters will have an intrinsic viscosity of at least about 0.4 deciliters/gram and preferably, at least 0.7 deciliters/gram as measured in a 60:40 phenol/tetrachloroethane mixture at 30° C.

In preferred features, the present composition can include a segmented copolyester resin or a silicone polymer. Typical of the former are the HYTREL Resins of the DuPont Company e.g. HYTREL 4055 and 4056. See also U.S. Pat. Nos. 3,651,014 and 3,766,146, incorporated herein by reference. Silicone resins can comprise conventional polydiorganosiloxanes alone, or with fillers, such as the SS-4217 composition sold by General Electric Company. The compositions can also include from a small amount of up to about 30% by weight of a filamentous glass reinforcement. The filamentous glass is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.0001 and 0.125 (one-eighth) inch.

In general, best properties will be obtained if component (c) comprises from at least about 1 part by weight and, preferably, from about 5 to about 100 parts by weight, and especially preferably, from about 5 to about 60 parts by weight per 100 parts by weight of components (a), (b) and (c).

The resinous components can vary widely in amount. Preferably, however, the composition will comprise from about 1 to about 99 parts by weight of poly(1,4-butylene terephthalate), from about 99 to about 1 parts by weight of component (b), i.e., the poly(ethylene terephthalate) resin per 100 parts by weight of the total resinous components in the compositions.

The compositions of this invention will include, as component (c) (i), talc, and as component (c) (ii) silica. These can have, e.g., a particle size of from less than 325 mesh to about 10 mesh. Component (c) will generally comprise from about 1 to about 99 parts by weight of (c) (i) and from about 99 to about 1 parts by weight of (c) (ii) per 100 parts by weight of component (c), and preferably from about 5 to about 25 parts by weight of (c) (i) and from about 75 to about 25 parts by weight of (c) (ii) per 100 parts by weight of component (c).

Other ingredients, such as dyes, pigments, stabilizers, plasticizers, flame retardants, drip retardants, and the like can be added for their conventionally employed purposes. Illustrative flame retardant additives are disclosed in U.S. Pat. Nos. 3,833,685, 3,341,154, 3,195,926 and 3,671,487, which are disclosed in U.S. Pat. Nos. 3,681,281, and 3,557,053, 3,830,771 and U.K. Pat. No. 1,358,080, all of which are incorporated by reference.

The compositions of this invention can be prepared by a number of procedures. In one way, component (c) is put into an extrusion compounder with the resinous components to produce molding pellets. The talc and silica combination is dispersed in a matrix of the resins in the process. In another procedure, component (c) is mixed with the resins by dry blending, then either fluxed on a mill and comminuted, or they are extruded and chopped. The warp resistance enhancing agent (c) can also be mixed with the resins and directly molded, e.g., by injection or transfer molding techniques.

Although it is not essential, best results are obtained if the ingredients are pre-compounded, pelletized and then molded. Pre-compounding can be carried out in conventional equipment. For example, after carefully pre-drying the polyesters and component (c), e.g., at 125° C. for 4 hours, a single screw extruder is fed with a dry blend of the ingredients, the screw employed having a long transition section to ensure proper melting. On the other hand, a twin screw extrusion machine, e.g., a 28 mm Werner Pfleiderer machine can be fed with resin and additives at the feed port and reinforcement down stream. In either case, a generally suitable machine temperature will be about 450° to 570° F.

The pre-compounded composition can be extruded and cut up into molding compounds such as conventional granules, pellets, etc., by standard techniques. The composition can be molded in any equipment conventially used for glass-filled thermoplastic compositions, e.g., a Newbury type injection molding machine with conventional cylinder temperatures, e.g., 525° F. and conventional mold temperatures, e.g., 150° F.

DESCRIPTION OF THE PREFERRED EMBODIMENTS

The following examples illustrate the invention. They are set forth as a further description but are not to be construed as limiting the invention thereto.

EXAMPLES 1-2

A dry blend of poly(1,4-butylene terephthalate), (VALOX 310, General Electric Co.), poly(ethylene terephthalate) (VITEL-3801, Goodyear), a segmented copolyester resin (HYTREL 4055, DuPont), optionally ⅛" glass fibers (Owens Corning OCF 419), Ferro 904 antioxidant, mold release agent, talc (EMTAL 500) and silica (IMSIL-A10) are compounded and extruded at 450°-570° F. in an extruder. The extrudate is pelletized and injection molded at 525° F. (mold temperature 150° F.). For comparison purposes a composition is prepared without silica. The formulations and physical properties obtained are shown in Table 1.

Table 1.

| Physical Properties of Reinforced Compositions | | | |
|---|---|---|---|
| Example | 1 | 1A* | 2** |
| Ingredients (parts by weight) | | | |
| poly(1,4-butylene terephthalate | 30 | 35 | 30 |
| poly(ethylene terephthalate) | 20 | 23 | 20 |
| segmented copolyester resin | 10 | 10 | 10 |
| fibrous glass reinforcement ⅛ inch | — | 2 | — |
| antioxidant | 0.05 | 0.05 | 0.05 |
| talc | 10 | 30 | 10 |
| silica | 30 | — | 30 |
| mold release agent | 0.1 | 0.1 | 0.1 |
| Properties | | | |
| Deflection Temp. under load at 264 psi, ° F. | 184 | 246 | 172 |
| Notched Izod impact, ft.lbs./in. | 0.8 | 0.9 | 0.8 |
| Unnotched Izod impact, ft.lbs./in. | 10.4 | 5.7 | 9.4 |
| Tensile strength, psi | 6,600 | 7,300 | 6,400 |
| Flexural modulus, psi | 656,000 | 842,000 | 683,000 |
| Flexural strength, psi | 13,000 | 13,000 | 13,000 |
| Warp on 4 inch Disc (mm.) | 0 | 0 | 0 |
| Warp after 30 min. at 350° F. (mm.) | 0 | 8 | 2 |

*Control
**Re-run of Example 1.

When the composition of this invention (Example 1) is injection molded into a four inch disc the warpage after heating is zero in one case and only 2 mm in the other. In contrast thereto, an identical part molded from control sample (1A* and) has significantly increased warpage of 8 mm.

EXAMPLES 3-5

Dry blends of poly(1,4-butylene terephthalate), poly(ethylene terephthalate), optionally 1/8 inch glass fibers (OCF 419), Ferro 904 antioxidant, mold release agent, talc, silica and a silicone compound (GE SS-4217) are compounded and extruded at 520° F. (mold temperature 150° F.). The formulations and the physical properties obtained are shown in Table 2.

Table 2.

| Physical Properties of Reinforced Compositions | | | |
|---|---|---|---|
| Example | 3 | 4 | 5 |
| Ingredients (parts by weight) | | | |
| poly(1,4-butylene terephthalate) | 31.5 | 33 | 30 |
| poly(ethylene terephthalate) | 21 | 22 | 20 |
| fibrous glass reinforcement | 2.5 | — | — |

Table 2.-continued

| Physical Properties of Reinforced Compositions | | | |
|---|---|---|---|
| Example | 3 | 4 | 5 |
| talc | 10 | 10 | 10 |
| silica | 30 | 30 | 30 |
| Ferro 904/mold release | 0.05/.1 | 0.05/.1 | 0.05/.1 |
| silicone* | 5 | 5 | 10 |
| Properties | | | |
| Deflection Temp. under load at 264 psi, ° F. | 294 | 188 | 190 |
| Notched Izod impact, ft.lbs./in. | 0.7 | 0.6 | 0.7 |
| Unnotched Izod impact, ft.lbs./in. | 5.1 | 5.5 | 5.1 |
| Flexural strength, psi | 14,000 | 16,000 | 12,000 |
| Tensile strength, psi | 7,200 | 7,100 | 6,000 |
| Flexural modulus, psi | 847,000 | 859,000 | 741,000 |
| Warp on 4 inch Disc, mm. | 0 | 0 | 0 |
| Warp after 30 min. at 350° F.,mm. | 0 | 0 | 0 |

*General Electric Co. SS-4217, physical blend of (i) a silicone gum (polydimethylsiloxane) containing methylvinyl siloxy units and (ii) fumed silica.

Examples 3–5 show remarkable warp resistance.

Obviously, other modifications and variations of the present invention are possible in the light of the above teachings. It is therefore, to be understood that changes may be made in the particular embodiments described above which are within the full intended scope of the invention as defined in the appended claims.

We claim:

1. A thermoplastic molding composition which, after molding, has increased resistance to warpage, the composition comprising, in intimate admixture:
    (a) a poly(1,4-butylene terephthalate) resin;
    (b) a poly(ethylene terephthalate) resin; and
    (c) a reinforcing and warp resistance improving amount of a combination of (i) talc and (ii) silica.

2. A composition as defined in claim 1 wherein component (a) comprises from 1 to 99 parts by weight and component (b) comprises from 99 to 1 parts by weight per 100 parts by weight of the total resinous components in the composition.

3. A composition as defined in claim 1 wherein component (c) is present in an amount of at least about 5 parts by weight per 100 parts by weight of the combined components (a), (b) and (c).

4. A composition as defined in claim 3 wherein component (c) is present in an amount of from about 5 to about 60 parts by weight per 100 parts by weight of the combined components (a), (b) and (c).

5. A composition as defined in claim 1 wherein component (c) (i) comprises from 1 to 99 parts by weight and component (c) (ii) comprises from 99 to 1 parts by weight per 100 parts by weight of component (c).

6. A composition as defined in claim 1 wherein component (c) (i) comprises from 5 to 25 and component (c) (ii) comprises from 75 to 25 parts by weight based on 100 parts by weight of component (c).

7. A composition as defined in claim 1 which also includes a segmented copolyester resin.

8. A composition as defined in claim 1 which also includes a polydiorganosiloxane.

9. A composition as defined in claim 1 which also includes a small amount of up to about 30 parts by weight of reinforcing fibrous glass per 100 parts by weight of the total composition.

10. A composition as defined in claim 1 wherein each resin component (a) and (b) has an intrinsic viscosity of at least about 0.4 deciliter per gram when measured in a solution in 60:40 mixture of phenol and tetrachloroethane at 30° C.

* * * * *